(12) United States Patent
Agarwal et al.

(10) Patent No.: US 10,680,852 B2
(45) Date of Patent: Jun. 9, 2020

(54) CONFIGURATION OF A MANAGED DEVICE

(71) Applicant: Hewlett Packard Enterprise Development LP, Houston, TX (US)

(72) Inventors: Piyush Agarwal, Sunnyvale, CA (US);
Raja Rangarajan, Sunnyvale, CA (US); Chirag Vaidya, Sunnyvale, CA (US); Joseph Baniqued, Sunnyvale, CA (US); Senthil Kumar V. S., Sunnyvale, CA (US); Toni Liu, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 311 days.

(21) Appl. No.: 15/223,098

(22) Filed: Jul. 29, 2016

(65) Prior Publication Data
US 2018/0019917 A1 Jan. 18, 2018

Related U.S. Application Data

(60) Provisional application No. 62/362,543, filed on Jul. 14, 2016.

(51) Int. Cl.
*H04L 12/46* (2006.01)
*H04L 12/24* (2006.01)

(52) U.S. Cl.
CPC ...... *H04L 12/4641* (2013.01); *H04L 41/0846* (2013.01); *H04L 41/0869* (2013.01)

(58) Field of Classification Search
CPC ............. H04L 12/4641; H04L 41/0846; H04L 41/0869

USPC ........................................................ 709/220
See application file for complete search history.

(56) References Cited

U.S. PATENT DOCUMENTS

| 6,834,301 B1 | 12/2004 | Hanchett |
| 7,089,530 B1 | 8/2006 | Dardinski et al. |
| 7,475,424 B2 * | 1/2009 | Lingafelt ............ H04L 63/0227 726/1 |

(Continued)

OTHER PUBLICATIONS

Hestermeyer, Thorsten, Oliver Oberschelp, and Holger Giese. "Structured Information Processing for Self-Optimizing Mechatronic Systems." In ICINCO (3), pp. 230-237. 2004, 8 Pgs.

*Primary Examiner* — Nicholas R Taylor
*Assistant Examiner* — Chong G Kim
(74) *Attorney, Agent, or Firm* — Brooks, Cameron & Huebsch, PLLC

(57) ABSTRACT

Example implementations relate to configuring a managed device. For example, configuration of a managed device may be performed by a services controller. The services controller may comprise a processing resource and a memory resource storing machine readable instructions to cause the processing resource to perform a number of actions. For instance, the services controller may manage configuration of a network using a hierarchical configuration model. The services controller may define a plurality of configuration elements for each of a plurality of managed devices in the hierarchical configuration model, where configuration elements shared among the plurality of managed devices are assigned a same setting from the services controller, and the configuration elements assigned by the services controller are customizable by each of the plurality of managed devices.

11 Claims, 6 Drawing Sheets

(56) References Cited

U.S. PATENT DOCUMENTS

| | | | |
|---|---|---|---|
| 8,539,548 B1 * | 9/2013 | Overby, Jr. | G06F 21/6218 |
| | | | 726/1 |
| 9,137,198 B2 | 9/2015 | Baniqued et al. | |
| 9,559,980 B2 * | 1/2017 | Li | H04L 47/782 |
| 10,009,287 B2 * | 6/2018 | Djukic | H04L 47/782 |
| 2002/0161879 A1 | 10/2002 | Richard | |
| 2003/0149753 A1 | 8/2003 | Lamb | |
| 2004/0019670 A1 | 1/2004 | Viswanath | |
| 2007/0189288 A1 | 8/2007 | Andrews | |
| 2010/0205281 A1 * | 8/2010 | Porter | H04L 41/12 |
| | | | 709/220 |
| 2015/0055623 A1 * | 2/2015 | Li | H04W 40/04 |
| | | | 370/331 |
| 2015/0163151 A1 * | 6/2015 | Li | H04L 47/2441 |
| | | | 370/236 |
| 2015/0163152 A1 * | 6/2015 | Li | H04L 47/2441 |
| | | | 370/409 |
| 2015/0188837 A1 * | 7/2015 | Djukic | H04L 47/782 |
| | | | 709/226 |
| 2015/0200859 A1 * | 7/2015 | Li | H04L 41/0823 |
| | | | 370/235 |
| 2015/0381410 A1 * | 12/2015 | Strassner | H04L 41/0803 |
| | | | 709/220 |
| 2016/0041953 A1 * | 2/2016 | DeRose | G06F 17/3089 |
| | | | 715/853 |
| 2017/0230239 A1 * | 8/2017 | Zhang | H04L 12/6418 |

\* cited by examiner

CONFIGURATION OF A MANAGED DEVICE

CROSS-REFERENCE TO RELATED APPLICATIONS

This application claims the benefit of U.S. Provisional Application 62/362,543, filed Jul. 14, 2016, which is incorporated by reference.

BACKGROUND

Some computing networks may support a global controller-local controller architecture, where the global controller provides services to local controllers, and the local controllers provide control plane and data plane services to end devices. The services provided by the global controller may include configuration, access point (AP) whitelist service for authenticating APs, rogue AP or client detection, centralized licensing and centralized image management services, among others. However, the global controller may have functionality outside of the management domain. For example, the global controller may also terminate APs and clients, and/or provide control or datapath services and may, in some cases, serve as a redundant controller for the local controllers.

DETAILED DESCRIPTION

Figure 1:
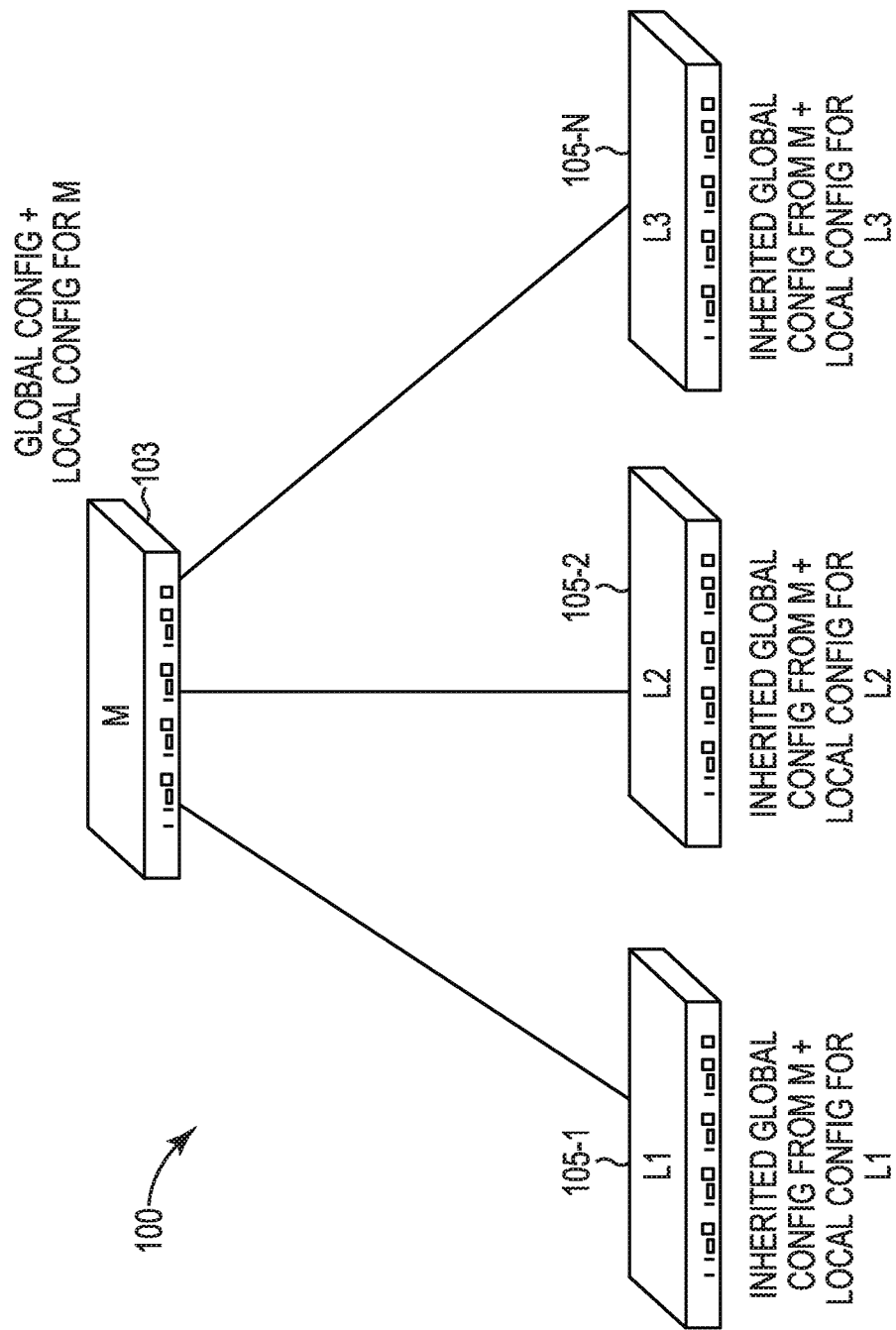
FIG. 1 illustrates an example network consistent with the present disclosure.

Moreover, configuration of controllers in such networks may include two parts: global configuration and local configuration. The global configuration may be applied on the global controller, and propagated to all local controllers via the global controller. Examples of global configurations may include a wireless local area network (WLAN) profile, and/or an authentication, authorization and accounting (AAA) profile, among others. Likewise, the local configuration may be directly applied on respective local controllers. Examples of local configurations may include identification of a virtual local area network (VLAN), and/or identification of internet protocol (IP) addresses of interface, among others. In some instances, the global configuration may only be applied on the global controller, and the respective local configurations may be applied on both the global controller and local controllers.

This two-tiered configuration model may provide added complexity in configuring a deployment for a network having a global-local architecture. Simple deployments may be desired, where devices are able to provision themselves by learning the required information from the network and becoming operational without requiring human intervention. Remote sites within the network in particular may not have skilled personnel on-site, and therefore, it may be desirable for remote network devices to be entirely managed from a central point. Moreover, a network with a single global controller and multiple local controllers may support a single global configuration. This global configuration may represent a flat configuration model, with single management access control for configuration that gets propagated to all local controllers in the network. Local configuration, in contrast, may be tailored for individual local controllers, but must be entered on these individual controllers.

Put another way, a user may not be able to upgrade a particular local controller to a newer version without upgrading of entire network, including the global controller and all local controllers. This may require tremendous coordination and human capital for a big enterprise that has local controllers spread across geographic locations.

In contrast, a hierarchical configuration model of a network, consistent with the present disclosure, creates a multi-tiered architecture with clear separation between management, control, and forwarding functions. Management functions may be populated from local controllers to a centralized virtual machine (VM) based management point, referred to herein as a "services controller". The services controller may be located in a data center across geographic boundaries or potentially in the cloud. This hierarchical configuration model provides a user the ability to configure the entire network from a centralized point, e.g., the services controller. This hierarchical organization model may support multiple configurations for multiple deployments, while using a single global and providing a structure to avoid duplicating common configurations.

FIG. 1 illustrates an example network 100 consistent with the present disclosure. As illustrated in FIG. 1, the network 100 may include a 2-level implicit hierarchy, including a global level comprising a global controller 103 (denoted as "M" in FIG. 1), and at least one local level comprising a plurality of local controllers 105-1, 105-2, . . . 105-N (collectively referred to herein as local controllers 105, and denoted as "L1", "L2", and "L3", respectively, in FIG. 1). The global level and the local level may be mutually exclusive and specified on different devices. That is, referring to FIG. 1, the global controller 103 may be configured with a global configuration, as well as a local configuration for the global controller 103, as the global controller 103 can terminate APs and clients. Similarly, each of the local controllers 105 may be configured with the global configuration inherited from the global controller 103, as well as a local configuration for that particular local controller. For instance, local controller 105-1 may be configured with the global configuration inherited from M, as well as the local configuration for L1. Similarly, local controller 105-2 may be configured with the global configuration inherited from M, as well as the local configuration for L2. Lastly, local controller 105-N may be configured with the global configuration inherited from M, as well as the local configuration for L3.

The organization of the network 100 may force the plurality of local controllers 105 to share the global configuration received from the global controller 103. However, to configure the entire network 100, multiple points may be configured: the global controller 103 and each individual controller among the plurality of local controllers 105. As such, the global controller 103 may manage multiple configuration elements. As used herein, a configuration element refers to a unit of controller configuration, that may be specific to a particular controller, or shared among a plurality of controllers. The configuration elements may be placed in a node of the hierarchical organization model, where configurations common to multiple network components are placed in "higher" nodes of the hierarchical organization model, whereas specific configurations are placed in "lower" nodes of the hierarchical organization model. That is, the hierarchical organization model may be illustrated in a tree structure, having nodes connected by edges. A network element, such as a local controller, branch controller, virtual private network (VPN) concentrator, among others, is mapped to one and only one node of the tree structure, referred to herein as a "device node" for that network element. Moreover, global configurations, common to all nodes in the tree, may be mapped to a "root node". The root node, the device node, and all nodes connecting the two may form what is referred to herein as a "node path" for that network element. Lastly, the configuration for a particular network element may be determined by merging configuration elements of all nodes in the node path of the particular network element, as described herein.

Figure 2:
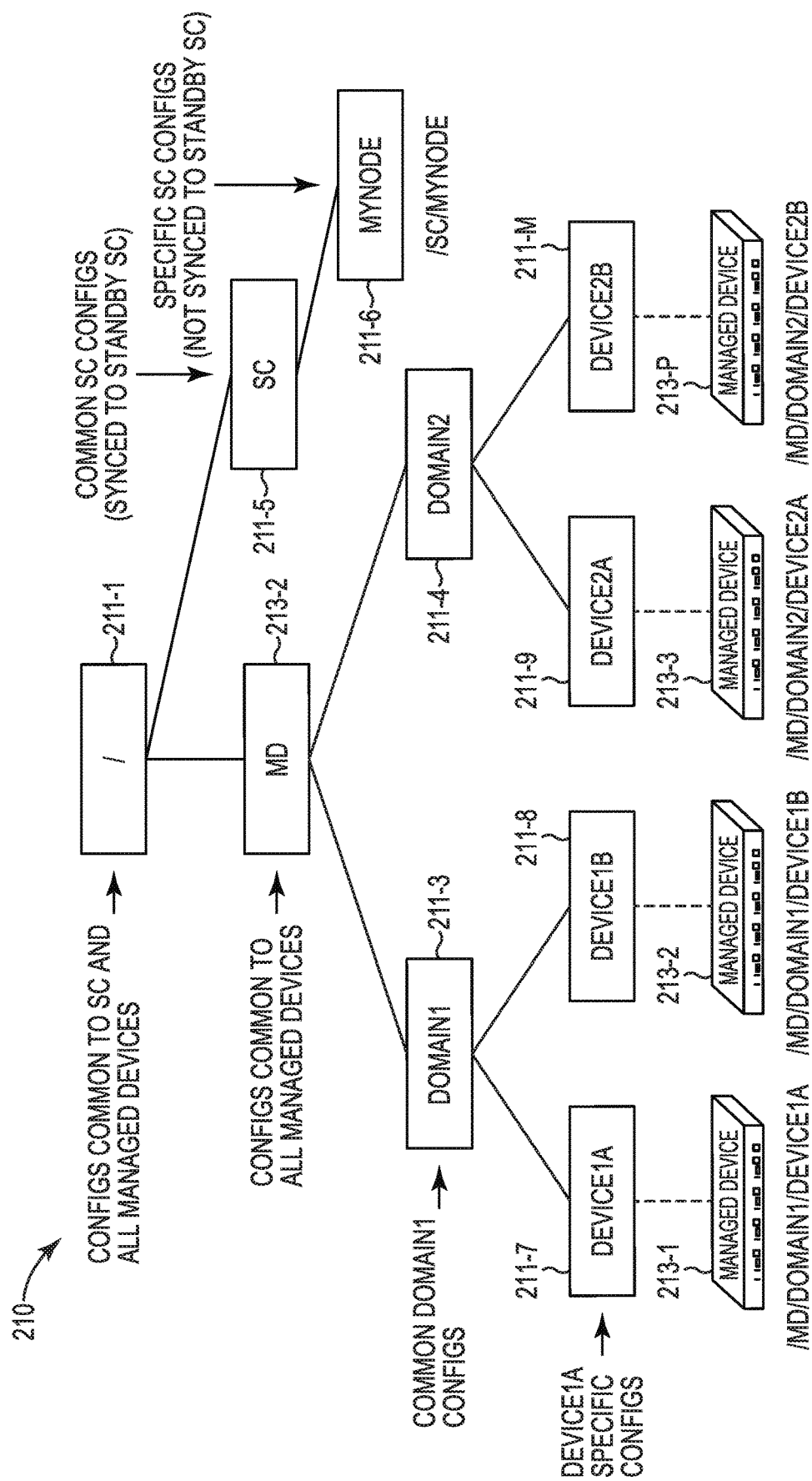
FIG. 2 illustrates an example hierarchical configuration model consistent with the present disclosure.

FIG. 2 illustrates an example hierarchical configuration model 210 consistent with the present disclosure. In FIG. 2, solid lines denote connections between nodes in the hierarchical configuration and dotted lines denote connections to the device mapping.

The hierarchical configuration model 210 includes a plurality of nodes 211-1, 211-2, . . . 211-M (hereinafter referred to collectively as nodes 211), and the nodes contain the configuration. The root (/) node 211-1 is the default node. The root node 211-1 may be indicated using "/" and child nodes may be separated using "/". A node of the plurality of nodes 211 may be addressed using a relative path or absolute path. To go to any node, a user may enter a command such as "change-config-node <new node>". At the bottom of the hierarchy are the managed devices 213-1, 213-2, 213-3, . . . , 213-P, that inherits the configuration from the hierarchical configuration model 210. A user may add a device and map it to a node, or a node path.

Figure 3:
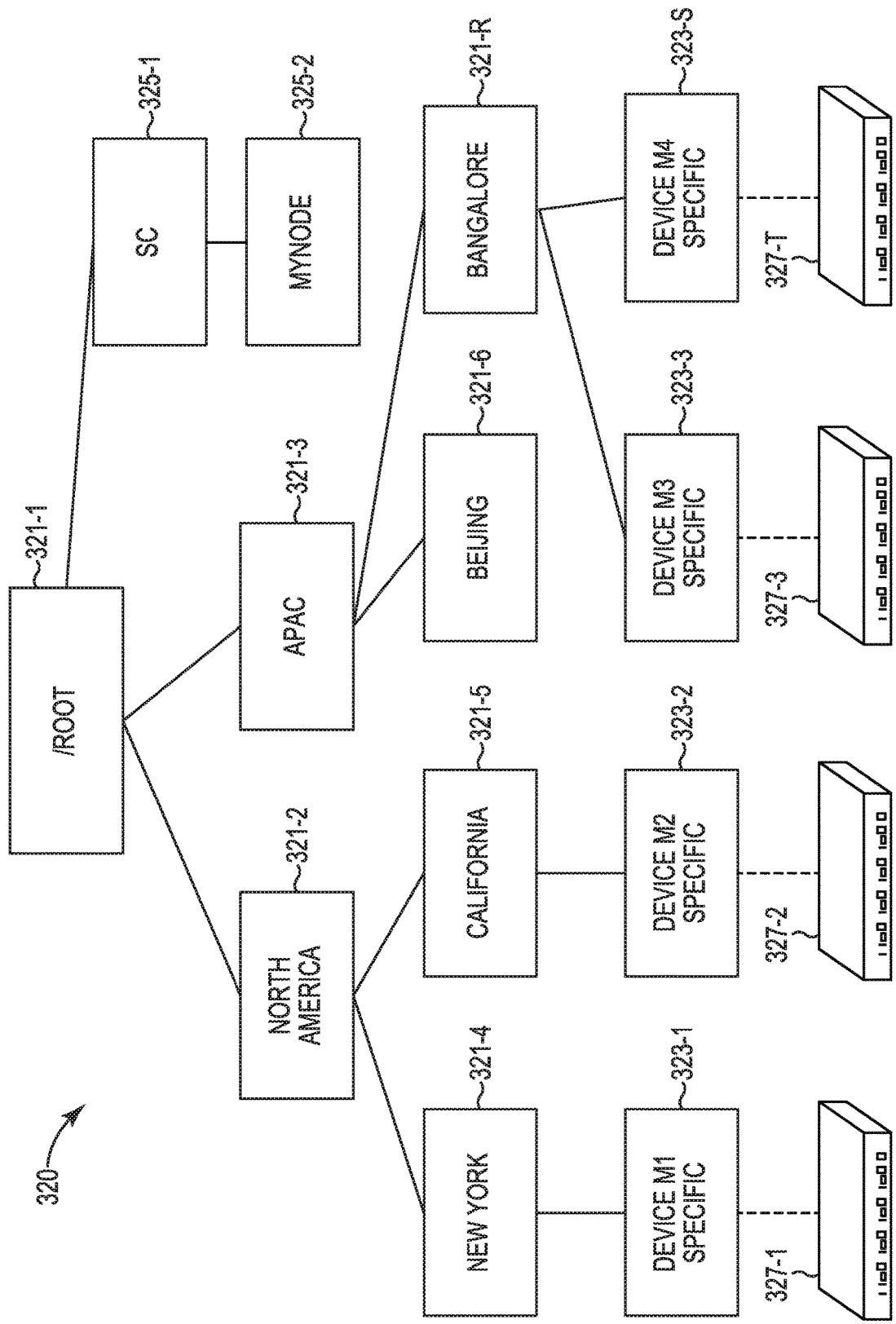
FIG. 3 further illustrates an example hierarchical configuration model consistent with the present disclosure.

FIG. 3 further illustrates an example hierarchical configuration model 320 consistent with the present disclosure. The hierarchical configuration model 320 illustrated in FIG. 3 may be the same as, or different than, the hierarchical configuration model 210 illustrated in FIG. 2.

In FIG. 3, to add device 327-2 (M2) under California, a user may enter a command such as "configuration device M2 device-model 7010/North America/California" from any node or simply "configuration device M2 device-model 7010" from the California node 321-5. When any device is mapped to a node in the configuration hierarchy, an explicit configuration node is created for that device by default. Examples of devices may include local controllers, branch gateways, VPN concentrators, and SC-S. A device managed by the services controller, irrespective of the device type, is referred to as a "managed node".

A configuration for a given node, and therefore a specific device, may be obtained by traversing the tree from the root (e.g., 321-1) to that node. For example, device M1 (327-1) may obtain a configuration from the root node 321-1, North America 321-2, and M1 device-specific nodes. The device node 323-1 may specify a configuration for device M1 (327-1) that may or may not overlap with another configuration in the hierarchical configuration model. For example, the device node 323-1 may include singleton commands such as an extended service set identification (ESSID) name in a service set identification (SSID) profile. Singleton commands in the device node configuration may overwrite (e.g., take a higher precedence or priority over) the configuration from the parent node. To illustrate, singleton commands for device node 323-1 would take priority over configurations received from node 321-4. For multi-instance commands such a server name in an authenticated server group, a configuration in a child node may be an addition to the parent configuration or a redefinition of the same instance with different parameters. To illustrate, if node 321-4 specifies two servers are included in an authenticated server group G1 and the device node 323-1 specifies three servers for the same group G1, the device 327-1 will have five servers in group G.

Again, referring to FIG. 3, each device (e.g., device 327-1, device 327-2, device 327-3, and device 327-T) will receive an effective configuration from the services controller that is flattened and ready for implementation by the device. If, for example, /ROOT node 321-1 may have a configuration of "ap-group default; virtual-ap global", North America node 321-3 may have a configuration of "ap-group default; virtual-ap vap-NA". Similarly, APAC node 321-3 may have a configuration of "interface vlan 10; mtu 1400". As used herein, "VAP" refers to identification of a virtual access point, and "mtu" refers to a maximum transmission unit of a communications protocol layer. New York node 321-4 may have a configuration of "ap-group NY; virtual-ap yap-NY", whereas device M4 specific node 323-S may have a configuration of "interface vlan 10; mtu 1200". The flattened configurations for each device (327-1, 327-2, 327-3, 327-T, respectively) may be as follows:

| Device M1 | Device M2 | Device M3 | Device M4 |
| --- | --- | --- | --- |
| ap-group default | ap-group default | ap-group default | ap-group default |
| virtual-ap global | virtual-ap global | virtual-ap global | virtual-ap global |
| virtual-ap vap-NA | virtual-ap vap-NA | Interface vlan 10 | virtual-ap global |
| ap-group NY | | mtu 1400 | Interface vlan 10 |
| virtual-ap vap-NY | | | mtu 1200 |

Note that the configuration hierarchy illustrated in FIGS. 2 and 3 do not represent a physical topology for the network. Instead, the configuration hierarchy models organize the configurations such that configuration segments that are shared across multiple devices need not be duplicated. For illustration, the hierarchical configuration model may be added the common configuration for the entire domain in the root node 321-1, region specific overrides may be added in the corresponding child nodes representing various regions. As such, users, such as users of network 100 illustrated in FIG. 1, may configure the network 100 in a number of different ways. Users may configure the network based on geographical boundaries, based on their organizational structure, and/or based on platform types, among other examples.

Figure 4:
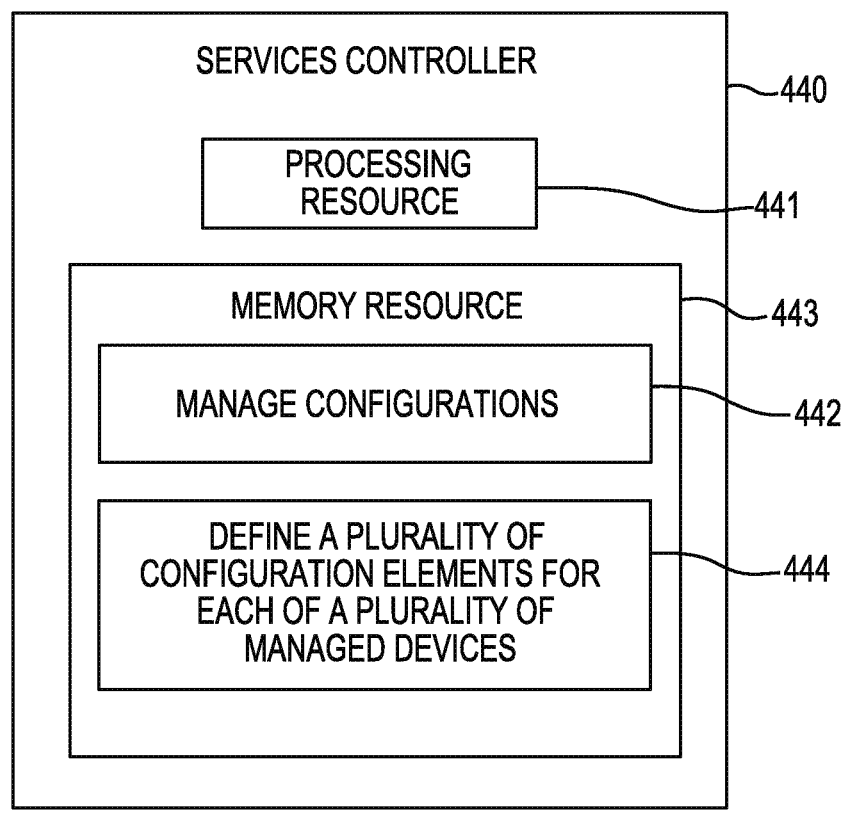
FIG. 4 is a block diagram of an example services controller for a hierarchical configuration model of a network, consistent with the present disclosure.

FIG. 4 is a block diagram of an example services controller 440 for a hierarchical configuration model of a network, consistent with the present disclosure. As described herein, the services controller 440 may perform a number of functions related to a hierarchical configuration model of a network. Although not illustrated in FIG. 4, the services controller may include a processor and a machine-readable storage medium. Although the following descriptions refer to a single processor and a single machine-readable storage medium, the descriptions may also apply to a system with multiple processors and multiple machine-readable storage mediums. In such examples, the services controller may be distributed across multiple machine-readable storage mediums and the services controller may be distributed across multiple processors. Put another way, the instructions executed by the services controller may be stored across multiple machine-readable storage mediums and executed across multiple processors, such as in a distributed or virtual computing environment.

As illustrated in FIG. 4, the services controller 440 may comprise a processing resource 441, and a memory resource 443 storing machine readable instructions to cause the processing resource to perform a number of operations relating to configuration of a managed device. That is, using the processing resource 441 and the memory resource 443, the services controller 440 may manage configurations of a network, such as network 100 illustrated in FIG. 1, among other operations. Processing resource 441 may be a central processing unit (CPU), microprocessor, and/or other hardware device suitable for retrieval and execution of instructions stored in memory resource 443.

The services controller 440 may include instructions 442 stored in the memory resource 443 and executable by the processing resource 441 to manage configuration of the network using a hierarchical configuration model. That is, the services controller 440 may include instructions 442 stored in the memory resource 443 and executable by the processing resource 441 to define a plurality of configuration elements for each of a plurality of managed devices in the hierarchical configuration model. Moreover, the services controller 440 may include instructions 444 stored in the memory resource 443 and executable by the processing resource 441 to define the configuration elements for each of the managed devices, such that configuration elements shared among the plurality of managed devices are assigned a same setting from the services controller. As described in relation to FIGS. 1, 2, and 3, the services controller 440, via the processing resource 441 and memory resource 443, may define the configuration elements, such that the configuration elements assigned by the services controller are customizable by each of the plurality of managed devices. In such a manner, the managed devices may receive common configurations to all devices, such as from a root node (e.g., root node 321-1 illustrated in FIG. 3), and yet receive customized configurations from the services controller 440 based on regional, platform, divisional, or other factors.

Put another way, the hierarchical configuration model illustrated in FIG. 3 may provide configurations for each managed device in a network. In turn, the services controller 440 may include instructions stored in the memory resource 443 and executable by the processing resource 441 to define and/or provide default configurations for the managed devices in the hierarchical configuration model by assigning a plurality of configuration elements associated with the services controller to the managed devices. That is, the services controller that provides the hierarchical configuration may also have configuration for itself, as it supports services, which may have configurations. The configuration for the services controller 440 may be obtained by the same mechanism as for other devices, by generating a leaf node in the hierarchical configuration. Referring to FIG. 3, the configuration for the services controller 440 is illustrated at 325-1 and 325-2. The /SC node 325-1 and the /SC/mynode node 325-2 are special system generated nodes created for configuration of the services controller 440, in addition to the root node 321-1. While the configuration in /SC/mynode 325-2 may be specific to a particular services controller (such as 440), the /SC node 325-1 may be synced to a standby services controller and therefore not specific to a particular services controller. In other words, configuration in /SC 325-1 is synced to the standby services controller, but configuration in /SC/mynode 325-3 is not synced and is done individually on each services controller device.

As such, the services controller 440 may include instructions stored in the memory resource 443 and executable by the processing resource 441 to create and implement a hierarchical configuration of a network. The services controller 440 may represent each of the plurality of managed devices in the hierarchical configuration model as a different respective child node, and associate each respective child node with a plurality of configuration elements, as discussed in relation to FIG. 3. Again, as discussed in relation to FIG. 3, a configuration for a particular managed device may be obtained by merging shared configuration elements with device specific configurations. That is, the services controller 440 may include instructions stored in the memory resource 443 and executable by the processing resource 441 to define the configuration element settings for a particular managed device among the plurality of managed devices by merging the settings for the shared configuration elements with a device specific configuration. Referring to FIG. 3, the services controller may define the configuration elements for device 327-1 by merging the configuration elements for node 321-1, 321-2, 321-4, and 323-1. As described herein, each managed device may be either a local controller or an end device. As such, in some examples, the services controller 440 may include instructions stored in the memory resource 443 and executable by the processing resource 441 to define the plurality of configuration elements for an end device, such as 405-2, by merging a plurality of configuration elements of the services controller 440, the configuration elements of an associated local controller, and user-configurable configuration elements of the end device 405-2.

Notably, the services controller 440 may include instructions stored in the memory resource 443 and executable by the processing resource 441 to provide higher precedence to different levels in the hierarchical configurations illustrated in FIGS. 2 and 3. For instance, the services controller 440 may to give higher precedence to configurations of end devices, such as configurations associated with nodes 323-1, 323-2, 323-3, and 323-S, than configurations of local controllers or higher nodes, such as 321-2 and 321-3.

Figure 5:
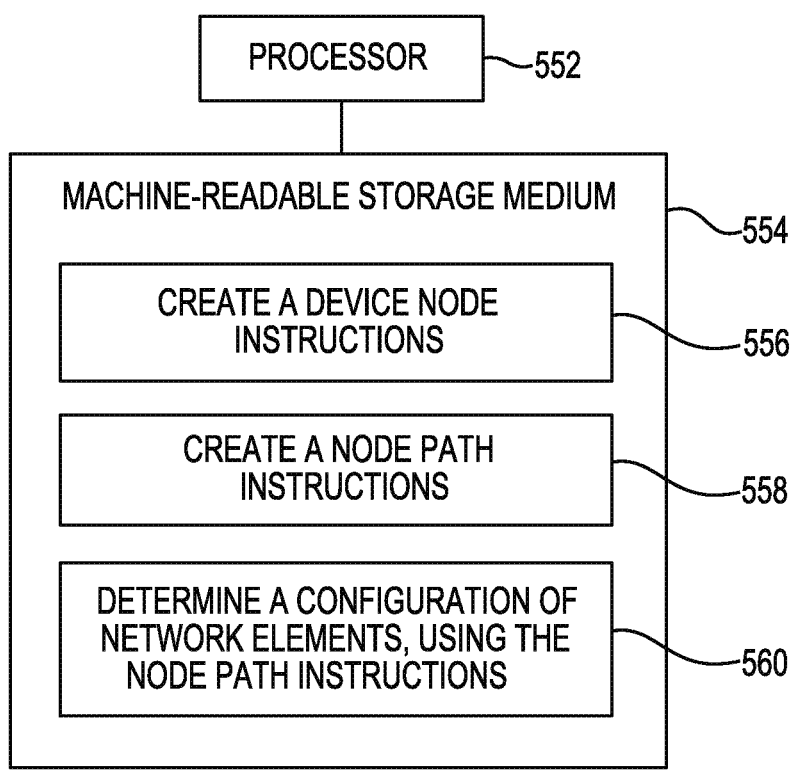
FIG. 5 is a block diagram of an example system, consistent with the present disclosure.

FIG. 5 is a block diagram of an example system, consistent with the present disclosure. System may include a computing device that is capable of communicating with a remote system. In the example of FIG. 5, system includes a processor 552 and a machine-readable storage medium 554. Although the following descriptions refer to a single processor and a single machine-readable storage medium, the descriptions may also apply to a system with multiple processors and multiple machine-readable storage mediums. In such examples, the instructions may be distributed across multiple machine-readable storage mediums and the instructions may be distributed across multiple processors. Put another way, the instructions may be stored across multiple machine-readable storage mediums and executed across multiple processors, such as in a distributed computing environment.

Processor 552 may be a central processing unit (CPU), microprocessor, and/or other hardware device suitable for retrieval and execution of instructions stored in machine-readable storage medium 554. In the particular example shown in FIG. 5, processor 552 may receive, determine, and send instructions 556, 558, 560. As an alternative or in addition to retrieving and executing instructions, processor 552 may include an electronic circuit comprising a number of electronic components for performing the operations of the instructions in machine-readable storage medium 554.

With respect to the executable instruction representations or boxes described and shown herein, it should be understood that part or all of the executable instructions and/or electronic circuits included within one box may be included in a different box shown in the figures or in a different box not shown.

Machine-readable storage medium 554 may be any electronic, magnetic, optical, or other physical storage device that stores executable instructions. Thus, machine-readable storage medium 554 may be, for example, Random Access Memory (RAM), an Electrically-Erasable Programmable Read-Only Memory (EEPROM), a storage drive, an optical disc, and the like. The executable instructions may be "installed" on the system illustrated in FIG. 5. Machine-readable storage medium 554 may be a portable, external or remote storage medium, for example, that allows the system to download the instructions from the portable/external/remote storage medium. In this situation, the executable instructions may be part of an "installation package". As described herein, machine-readable storage medium 554 may be encoded with executable instructions for managing a network using a hierarchical configuration model.

Create a device node instructions 556, when executed by a processor such as processor 552, may cause system 550 to create a device node in a hierarchical configuration model using a configuration node command and a services controller, wherein the device node is associated with a managed device in a network. The instructions to create the device node in the hierarchical configuration model may include instructions to map the managed device to the device node in response to receipt of a node configuration command. When a user is done creating a logical block of a configuration, the system 550 may evaluate the configuration, and when satisfied with the configuration, the system 550 may commit the configuration. As used herein, a committed configuration refers to a hierarchical configuration that is operational in the network, such as network 100 illustrated in FIG. 1. Such distinction between configurations and committed configurations may avoid issues due to a user entering a wrong configuration value by mistake, and realizing it only later due to unexpected behavior. The granularity of a committed configuration operation may be a single node. That is, a node-level commit operation allows per-node configuration commits without interfering with the pending (e.g., non-committed) configuration on other nodes.

In such a manner, the services controller (e.g., 440 illustrated in FIG. 4), may maintain "working configurations" and "committed configurations" for each of the nodes in the hierarchical configuration model. As used herein, a "working configuration" refers to a configuration that has not yet been committed. A user may be able to see working configurations at any point in creation, and decide to commit it the working configuration, purge the working configuration, or leave the working configuration uncommitted. As such, the system may include instructions to maintain a list of working configurations and committed configurations for each node in the hierarchical configuration model.

The system may also include instructions executable by a processor, such as processor 552, to save committed configurations. A "write memory" command may commit, i.e. apply, the configuration to the devices associated with device nodes, and save the committed configurations.

Create a node path instructions 558, when executed by a processor such as processor 552, may cause the system to create a node path for the managed device by traversing the hierarchical configuration model from a root node associated with the services controller to the device node, as described herein. In some examples, the instructions to create the node path for the managed device may include instructions to generate an override configuration for a node in the node path by altering a base node configuration received from the services controller, and populating the override configuration to all lower nodes in the hierarchical configuration model. That is, as described in relation to FIGS. 2 and 3, configurations of lower nodes in the hierarchical configuration may be given higher priority than configurations of higher nodes in the hierarchical configuration. In such a manner, a configuration for a lower node may override a configuration of a higher node in the hierarchical configuration. Similarly, the instructions to create the node path for the managed device may include instructions to augment a configuration element for the managed device by adding a second configuration for the configuration element, and populate the augmented configuration to all lower nodes in the hierarchical configuration model. For example, as described in relation to FIG. 3, a configuration inherited from higher level nodes in the hierarchical configuration may be augmented (e.g., added to) by configurations in lower level nodes in the hierarchical configuration.

Determine a configuration of network elements, using the node path instructions 560, when executed by a processor such as processor 552, may cause the system to determine a configuration of a plurality of network elements for the managed device, using the node path. That is, configuration settings that the managed device shares with other managed devices in the network may be received from the services controller. Moreover, instructions, when executed by a processor such as processor 552, may cause the system to configure the managed device according to the configuration of the plurality of network elements. That is, as described herein, managed device 327-T may be configured to, among other things, interface with VLAN 10, with an MTU of 1200.

Figure 6:
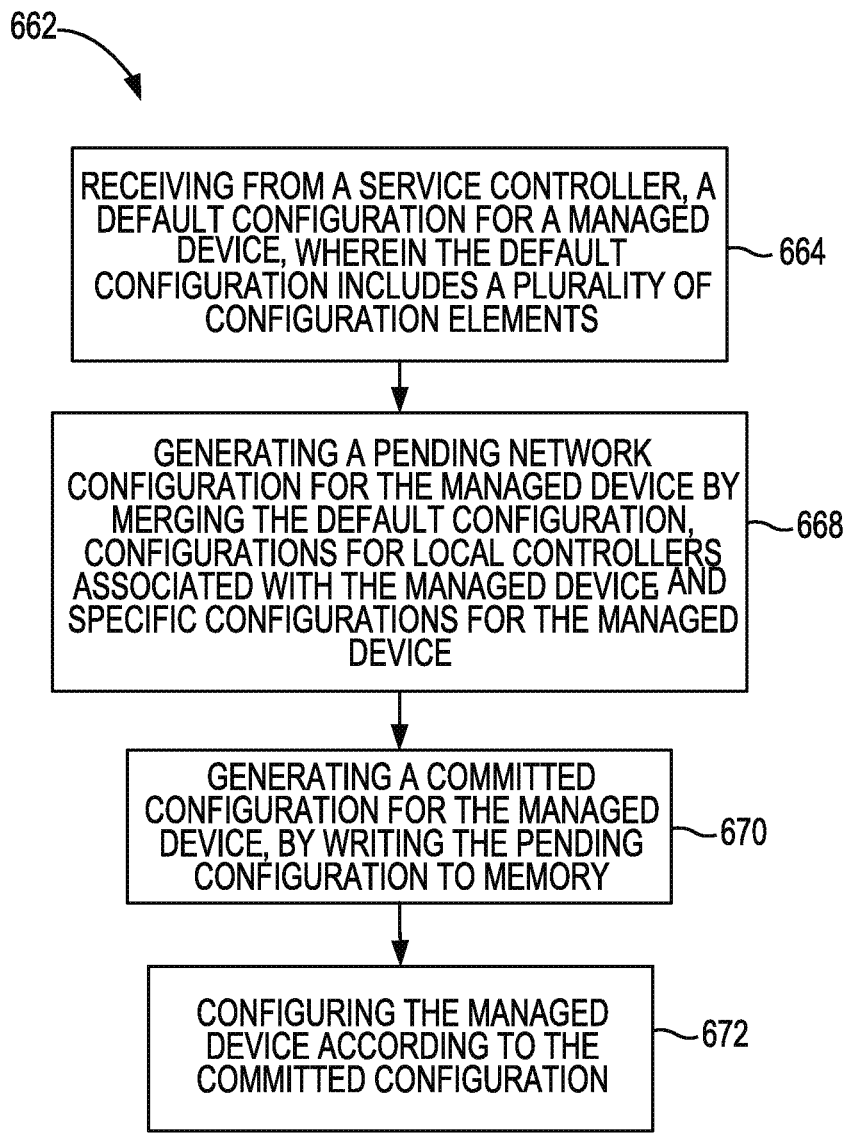
FIG. 6 illustrates an example method, consistent with the present disclosure.

FIG. 6 illustrates an example method 662 consistent with the present disclosure. At 664, the method 662 may include receiving from a service controller, a default configuration for a managed device. As described herein, a configuration for a managed device includes a plurality of configuration elements.

At 668, the method 662 may include generating a pending network configuration for the managed device. As described herein, generating the pending network configuration may be achieved by merging the default configuration, configurations for local controllers associated with the managed device, and specific configurations for the managed device.

At 670, the method 662 may include generating a committed configuration for the managed device. As described herein, the committed configuration for the managed device may be generated by writing the pending configuration to memory.

At 672, the method 662 may include configuring the managed device according to the committed configuration. As described herein, configuring the managed device according to the committed configuration may result in implementation of such configurations by the managed device. For instance, a managed device may interface with a particular VLAN in the network, with a predefined MTU.

In some examples, the method 662 may include generating a new pending network configuration for the managed device, in response to receipt of a new default configuration from the service controller, and generating a new committed configuration for the managed device, in response to receipt of the new pending network configuration. Put another way, an administrator and/or user of the network may add a new configuration that is to apply to all managed devices. Such global configuration may be pushed to all nodes in the hierarchical configuration model, and therefore, configurations for individual managed devices may be modified. As discussed herein, creation of a configuration for a managed device may include creation of a pending configuration, and a committed configuration, where the committed configuration is applied to the managed device.

In some examples, the method 662 may include receiving from a local controller associated with the managed device, a new configuration for the local controller, and generating a new pending network configuration and a new committed configuration for the managed device, in response to receipt of the new configuration for the local controller. That is, a node in the hierarchical configuration model that is not the root node or a device node may be revised to include new and/or additional configurations. In response to such revisions to an intervening node, lower (e.g., dependent) nodes in the hierarchical configuration model may be revised as well, resulting in generation of a new pending configuration and a new committed configuration.

In some examples, the method 662 may include performing additional operations to manage the network using a hierarchical configuration model. For instance, a create node operation may be performed, as discussed herein, to create a new node as a child of an existing node in the hierarchical configuration. Similarly, an add device operation may be performed, to associate a device to an existing node in the configuration hierarchy. The associated device will inherit configuration from the root node and all the other nodes that connect this device to the root node, e.g., according to the node path, as discussed herein.

In some examples, a delete node command may be used to delete an existing user created node. System generated nodes may be prevented from deletion, and the delete node command may be limited such that nodes with no children (e.g., "leaf nodes") may be the only nodes that can be deleted. In some examples, nodes that have managed devices inheriting configuration from them may not be deleted.

Other operations may include a delete device operation, which deletes a currently associated device from the hierarchical configuration. A move device operation may move a currently associated device to some other node in the configuration hierarchy. This device may then inherit configuration from the new node path instead of the old one. A clone node operation may create a copy of the configuration of an existing node to a new node, and attach the newly created node to some other existing node in the configuration hierarchy.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, the designators "N", "M", "P", "R", "S", and "T", particularly with respect to reference numerals in the drawings, indicates that a number of the particular feature so designated can be included with examples of the present disclosure. The designators can represent the same or different numbers of the particular features. Further, as used herein, "a number of" an element and/or feature can refer to one or more of such elements and/or features.

What is claimed:

1. A services controller comprising:
a processing resource; and
a memory resource storing machine readable instructions to cause the processing resource to:
organize a plurality of remote controllers in a network into an individual global configuration;
manage configuration of the network using a hierarchical configuration model having root and local configurations; and
define a plurality of configuration elements for each of a plurality of managed devices in the hierarchical configuration model, wherein:
configuration elements shared among the plurality of managed devices are assigned a same root setting from the services controller; and
the configuration elements assigned by the services controller are customizable by each of the plurality of managed devices, in accordance with a local setting particular to each of the plurality of managed devices.

2. The services controller of claim 1, including instructions to cause the processing resource to define default configurations for the managed devices in the hierarchical configuration model by assigning a plurality of configuration elements associated with the services controller to the managed devices.

3. The services controller of claim 1, including instructions to cause the processing resource to:
represent each of the plurality of managed devices in the hierarchical configuration model as a different respective child node; and
associate each respective child node with a plurality of configuration elements.

4. The services controller of claim 1, including instructions to cause the processing resource to:
define the configuration element settings for a particular managed device among the plurality of managed devices by merging the settings for the shared configuration elements with a device specific configuration.

5. The services controller of claim 1, wherein each managed device is either a local controller or an end device, including instructions to cause the processing resource to:
define the plurality of configuration elements for an end device by merging:
a plurality of configuration elements of the services controller;
the configuration elements of an associated local controller; and
user configurable configuration elements of the end device.

6. The services controller of claim 5, including instructions to cause the processing resource to give higher precedence to configurations of end devices than configurations of local controllers.

7. A method comprising:

organizing, by a services controller, a plurality of remote controllers in a network into an individual global configuration;

managing, by the services controller, configuration of the network using a hierarchical configuration model having root and local configurations; and defining, by the services controller, a plurality of configuration elements for each of a plurality of managed devices in the hierarchical configuration model, wherein:

configuration elements shared among the plurality of managed devices are assigned a same root setting from the services controller; and the configuration elements assigned by the services controller are customizable by each of the plurality of managed devices, in accordance with a local setting particular to each of the plurality of managed devices.

8. The method of claim 7, further comprising, defining, by the services controller, default configurations for the managed devices in the hierarchical configuration model by assigning a plurality of configuration elements associated with the services controller to the managed devices.

9. The method of claim 7, further comprising:

representing, by the services controller, each of the plurality of managed devices in the hierarchical configuration model as a different respective child node; and associating, by the services controller, each respective child node with a plurality of configuration elements.

10. The method of claim 7, further comprising:

defining, by the services controller, the configuration element settings for a particular managed device among the plurality of managed devices by merging the settings for the shared configuration elements with a device specific configuration.

11. The method of claim 7, wherein each managed device is either a local controller or an end device, and wherein the method further comprises:

defining, by the services controller, the plurality of configuration elements for an end device by merging:

a plurality of configuration elements of the services controller;

the configuration elements of an associated local controller; and user configurable configuration elements of the end device; and giving higher precedence to configurations of end devices over configurations of local controllers.

* * * * *